United States Patent
Katooka et al.

(10) Patent No.: US 6,797,922 B2
(45) Date of Patent: Sep. 28, 2004

(54) POWER SUPPLY APPARATUS FOR WELDER

(75) Inventors: Masao Katooka, Osaka (JP); Kenzo Danjo, Osaka (JP); Takeshi Morimoto, Osaka (JP); Hideo Ishii, Osaka (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 9 days.

(21) Appl. No.: 10/414,882

(22) Filed: Apr. 16, 2003

(65) Prior Publication Data

US 2003/0201262 A1 Oct. 30, 2003

(30) Foreign Application Priority Data

Apr. 24, 2002 (JP) .......................................... 2002-122179

(51) Int. Cl.⁷ ................................................. B23K 9/09

(52) U.S. Cl. .............................. 219/130.51; 219/130.32

(58) Field of Search ....................... 219/130.51, 130.32, 219/130.31, 130.33, 137 PS

(56) References Cited

U.S. PATENT DOCUMENTS 5,525,778 A * 6/1996 Matsui et al. .......... 219/130.51

* cited by examiner

Primary Examiner—Clifford C. Shaw
(74) Attorney, Agent, or Firm—Duane Morris LLP

(57) ABSTRACT

A power supply apparatus for a welder includes a rectifier (104) and a smoothing reactor (106) which operate together to convert a commercial AC supply voltage to a DC voltage. The DC voltage is converted to a high-frequency voltage by an inverter (108), which, in turn, is voltage-transformed by a voltage-transformer (110). The voltage-transformed, high-frequency voltage is converted to a DC voltage by a rectifying diode (112) and a smoothing reactor (114), and the resulting DC voltage is applied to a workpiece (118*a*) and a torch (118*b*). A current detector (120) develops a load current representative signal, and a control circuit (122) so controls a drive circuit (126) which drives the inverter (108) that the load current representative signal becomes equal to a reference current signal provided by a reference source (124). When a small load current is used, a pulse forming switch (140) is repetitively turned on and off to produce a pulse current from a pulse current setting source (139). The pulse current is superposed on a control signal from the control circuit (122).

4 Claims, 4 Drawing Sheets

POWER SUPPLY APPARATUS FOR WELDER

This invention relates to a power supply apparatus for a welder and, more particularly, to such power supply apparatus which is adapted to supply a pulsating current to a welder load when it demands a small current.

BACKGROUND OF THE INVENTION

For welding small electronic components, laser is frequently used. Laser, however, requires special equipment, and a power supply apparatus for laser is expensive. Recently, therefore, there has been an increasing demand for TIG-welding of such components with a small current.

FIG. 1 shows a block circuit diagram of a prior art TIG welder. An AC voltage from a three-phase commercial AC power supply connected to input terminals 2a, 2b and 2c is applied to a rectifier 4 and is rectified. The output of the rectifier 4 is smoothed by a smoothing capacitor 6 into a DC voltage. The DC voltage is then applied to an inverter 8, where it is converted to a high-frequency voltage. The high-frequency voltage is applied to a transformer 10, where it is voltage-transformed to a high-frequency voltage having a given magnitude. The resultant voltage-transformed, high-frequency voltage is rectified by rectifying diodes 12, 12, and smoothed by a smoothing reactor 14 before it is supplied through output terminals 16a and 16b to a workpiece 18a and a torch 18b. A current detector 20 detects the current supplied to the workpiece 18a and torch 18b, and develops a current-representative signal representing the magnitude of the detected current. The current-representative signal is applied to a control circuit 22. The control circuit 22 receives also a reference current signal from a reference source 24. The control circuit 22 supplies such a control signal to a drive circuit 26 as to make the difference between the current-representative signal and the reference current signal zero (0). In response to the control signal, the drive circuit 26 controls conduction periods of semiconductor switching devices of the inverter 8, so that a load current corresponding to the reference current can be supplied to the workpiece 18a and torch 18b. A high-frequency generator 28 is coupled between the output terminal 16b and the smoothing reactor 14 via a coupling coil 30. The high-frequency generator 28 is used to break the insulation provided by the gap between the workpiece 18a and the torch 18b to thereby cause arcing therebetween to start. The high-frequency generator 28 applies a high-frequency voltage of from 5 kV to 20 kV at a frequency of from 1 MHz to 3 MHz between the workpiece 18a and the torch 18b for a short time for strting the welder. A capacitor 31 is for bypassing a high-frequency signal from the high-frequency generator 28.

Welder users sometimes desire to TIG weld small-sized electronic components with a small current of, for example, about 1 A. However, as is seen from FIG. 2, in order to sustain arcing, a load current of 0.5 A or greater is required. A smaller load current will cause interruption of arcing. Furthermore, a DC current transformer is sometimes used as the current detector 20. In such case, one current transformer must detect a current ranging from a small current of, for example, 1 A, up to a large current of 300 A, for example. At smaller current, such current transformer cannot develop a current-representative signal with linearity. In order to secure the linearity, a Hall-effect current detector may be used, but a Hall-effect current detector tends to produce drifts in the current-representative signal for a small current, and, therefore, such drifts must be controlled. To eliminate the need for such drift control, a series combination of a DC power supply 32, a current-limiting resistor 34 and a switch 36 is connected between the output terminals 16a and 16b. When a small current of, for example, 1 A, is required to flow through the workpiece 18a and the torch 18b, the switch 36 is closed. The DC power supply 32 may be provided, for example, by rectifying the commercial AC power supply, or by rectifying a voltage induced across an additional secondary winding wound on the transformer 10.

However, in order to provide the DC power supply 32, at least a rectifier is additionally required. When the transformer 10 is provided with an additional secondary winding, insulation must be provided between the additional secondary winding and the secondary winding to which the diodes 12 are connected. Thus, an isolation transformer must be used as the transformer 10. Further, when a large current is supplied to the workpiece 18a and torch 18b, the DC power supply 32 need not supply current, and, therefore, the switch 36 is opened. Like this, when a welder is arranged to operate with a small current as well as a large current, a complicated circuit arrangement is required.

A TIG welder may be provided with a sequencing circuit (not shown) and a sequencer control 38. The sequencing circuit is used for initiating operations, such as supplying of inert gas, and the sequencer control 38 is used for controlling the sequencing circuit. The sequencer control 38 detects when current flows through the workpiece 18a and torch 18b, and operates the sequencing circuit. When the load current is small, e.g. of 1 A, a current-representative signal sufficient to initiate the operation of the sequencing circuit is not available.

An object of the present invention is to provide a power supply apparatus for a welder, e.g. a TIG welder, which has a simple circuit arrangement, can perform TIG welding with a small current, and can make, without fail, a sequencing circuit operate even when the load current is small.

SUMMARY OF THE INVENTION

A power supply apparatus for a welder according to the present invention has a DC power supply, which, for example, may provide a DC signal by rectifying and smoothing an AC supply or, more specifically, a commercial AC supply. The DC signal from the DC power supply is converted to a high-frequency signal in high-frequency converting means, which may be high-frequency switching means, e.g. an inverter. A transformer transforms the high-frequency signal from the high-frequency converting means. DC converting means converts the transformed, high-frequency signal from the transformer to a DC signal and supplies a load current to a welder load. The load current can be set to a desired value within a range of current values. The DC converting means may be one including rectifying means and smoothing means. Pulse current supplying means is provided, which, when the load current to be supplied to the load from the DC converting means is set to a value smaller than a predetermined current value, supplies a pulse current having a peak value larger than the predetermined current value.

With the above-described arrangement, when the set load current value is below the predetermined current value, a pulse current having a peak value larger than the predetermined current value is supplied. The pulse current can enable, without fail, a sequencing circuit which controls supply of inert gas, for example. In addition, arcing can be sustained as long as the pulse current having a peak value larger than the predetermined current value is flowing.

The welder power supply apparatus may be provided with control means for controlling the high-frequency converting means in such a manner as to make the load current flowing through the welder load have the set current value. The control means receives a load-current representative signal representing the load current. The load-current representative signal may be provided from, for example, load current detecting means. The control means receives also a reference current signal representing the predetermined current value. The control means controls the high-frequency converting means in such a manner as to make the difference between the load-current representative signal and the reference current signal become zero (0). The pulse current supplying means controls the high-frequency converting means in such a manner that the load current flowing through the load can contain the pulse current when the set load current value is smaller than the predetermined current value. For example, when the load current value is set to a value smaller than the predetermined current value, the pulse current supplying means periodically superposes a pulsating signal on the load-current representative signal or on the reference current signal.

With this arrangement, the pulse current can be made to be contained in the load current through the control of the high-frequency converting means, which eliminates the need for providing a dedicated circuit for generating the pulse current in the output of the DC converting means. Thus, the circuitry of the welder power supply apparatus can be simplified.

Alternatively the pulse current supplying means may be arranged to supply the pulse current to the load repetitively at predetermined intervals. In such arrangement, charge-discharge means is provided in the output of the DC converting means. The charge-discharge means is charged with each pulse of the pulse current, and is discharged when no current pulse occurs.

With this arrangement, since the charge-discharge means is discharged when no current pulse occurs, the value of the load current can be maintained large when no current pulse occurs, and, therefore, disruption of arcing can be prevented.

The power supply apparatus may include a sequencer control operable in response to a pulse in the pulse current. Alternatively the sequencer control may be operated by the output of sample-and-hold means which samples and holds the load current.

Since the sequencer control is operated in response to the occurrence of the pulse current, the sequencing circuit controlled by the sequencer control, can be operated, without fail, to cause inert gas to be supplied, for example.

DETAILED DESCRIPTION OF THE INVENTION

Figure 1:
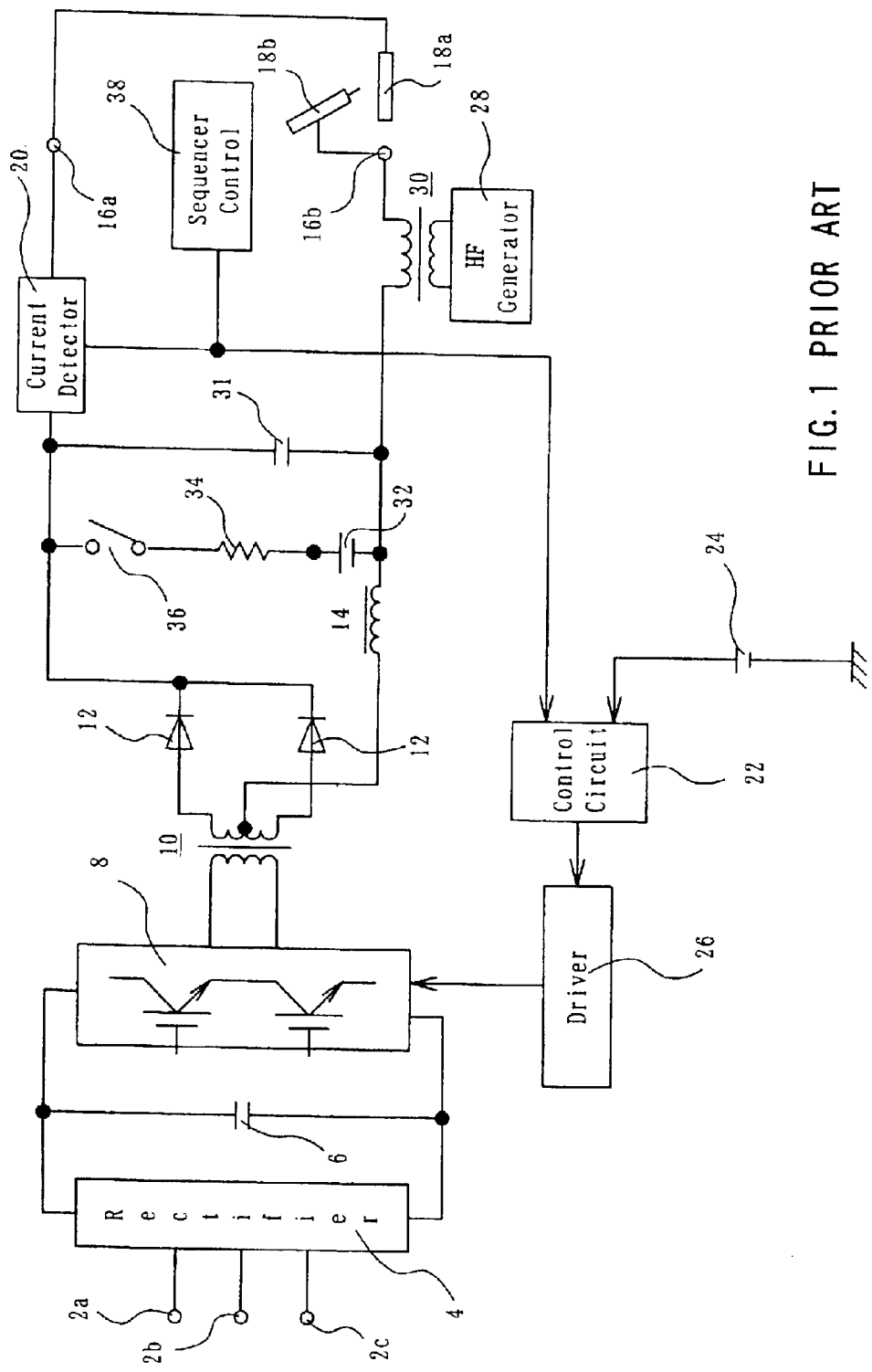
FIG. 1 is a block circuit diagram of a prior art power supply apparatus for a TIG welder.
Figure 2:
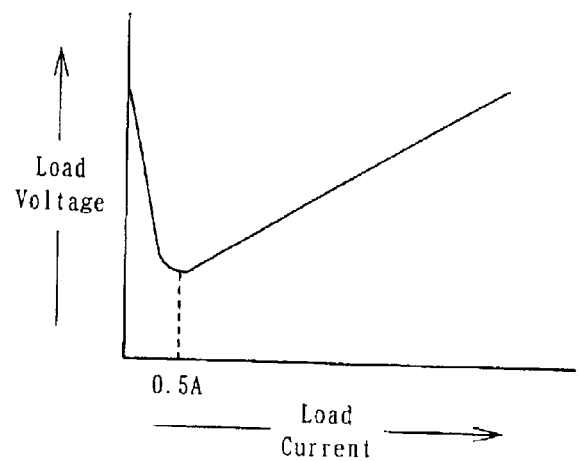
FIG. 2 illustrates relationship between a load current and a load voltage in the TIG welder power supply apparatus of FIG. 1.
Figure 3:
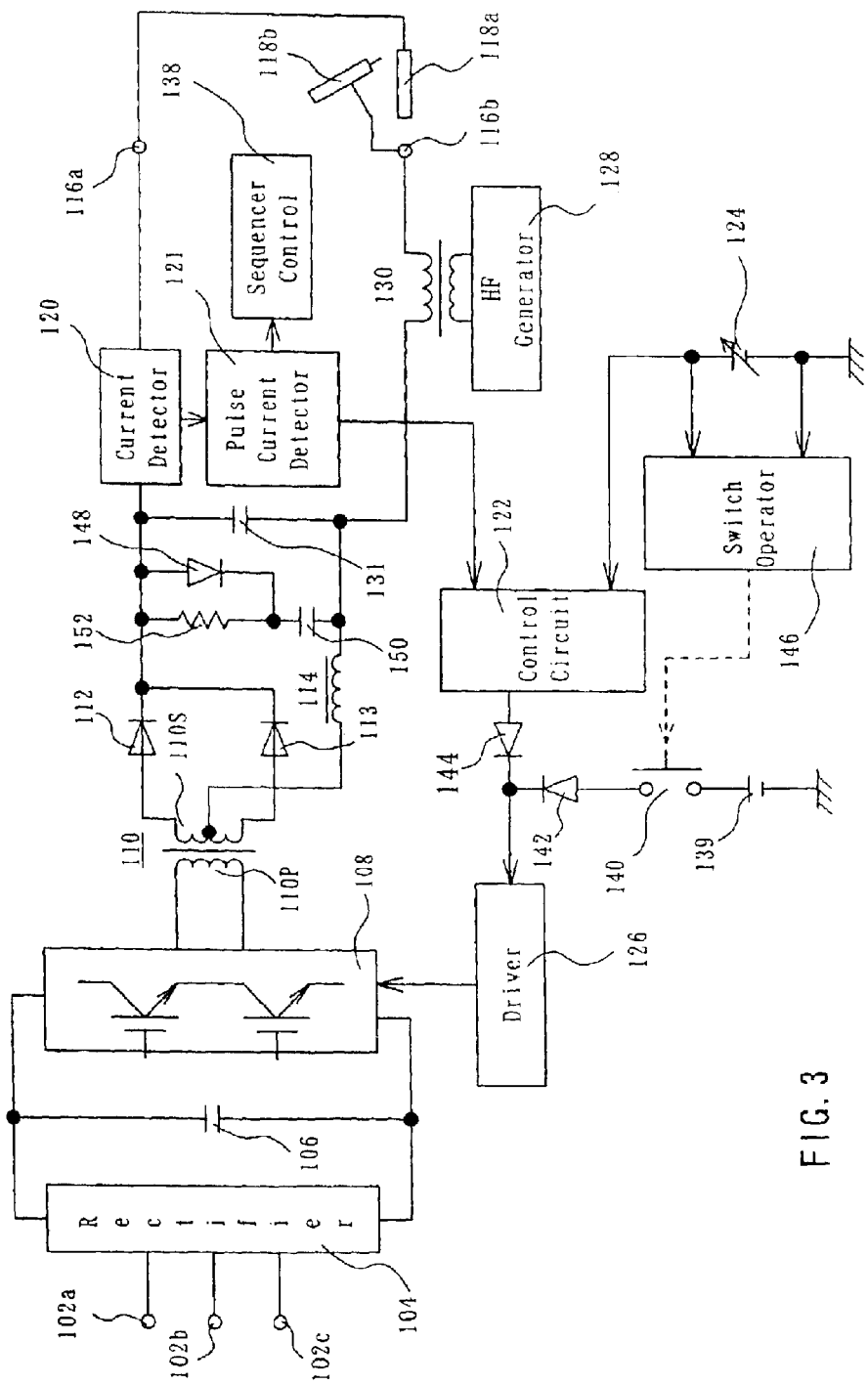
FIG. 3 is a block circuit diagram of a power supply apparatus for a TIG welder according to an embodiment of the present invention.

A power supply apparatus according to an embodiment of the present invention shown in FIG. 3 is for use with a TIG welder, and includes input terminals 102a, 102b and 102c. An AC power supply, e.g. a three-phase commercial AC power supply is coupled to the input terminals 102a–102c. In place of the three-phase commercial AC power supply, a single-phase commercial AC power supply may be used. An AC voltage from the three-phase commercial AC power supply is coupled to rectifying means, e.g. a rectifier 104, where it is rectified. The rectifier 104 is formed of a plurality of rectifying diodes (not shown), e.g. four rectifying diodes, connected in, for example, a full-bridge configuration. An output of the rectifier 104 is smoothed by a smoothing capacitor 106 into a DC voltage. The rectifier 104 and the smoothing capacitor 106 form a DC power supply.

The DC voltage from the DC power supply is coupled to high-frequency converting means, e.g. an inverter 108, where it is converted to a high-frequency voltage. The inverter 108 may be of a half-bridge type or a full-bridge type. In place of the inverter 108, a high-frequency switching circuit may be used, which is formed of semiconductor switching devices, e.g. IGBTs, power FETs, bipolar transistors, or thyristors.

A high-frequency voltage from the inverter 108 is coupled to a primary winding 110P of a transformer, e.g. a voltage-transformer 110, which also has a secondary winding 110S in which the high-frequency voltage voltage-transformed to a predetermined value is induced.

The anodes of rectifying diodes 112 and 113 are connected to the respective ones of the two ends of the secondary winding 110S of the voltage-transformer 110. The cathodes of the diodes 112 and 113 are connected together to an output terminal 116a of the power supply apparatus. An intermediate tap is disposed on the secondary winding 110S and connected to an output terminal 116b of the power supply apparatus through smoothing means, e.g. a smoothing reactor 114. The output terminal 116a is adapted to be connected to a workpiece 118a, while the output terminal 116b is adapted to be connected to a torch 118b. The workpiece 118a and the torch 118b form a welder load. Thus, in a state where the insulation provided by the gap between the workpiece 118a and the torch 118b is broken, the high-frequency voltage induced in the secondary winding 110S of the voltage-transformer 110 is rectified by the diodes 112 and 113, smoothed by the reactor 114, and applied between the workpiece 118a and the torch 118b, resulting in a DC load current flowing from the workpiece 118a to the torch 118b. The rectifying diodes 112 and the smoothing reactor 114 function together as DC converting means.

In order to keep the load current constant, a current detector 120 detects a current supplied to the workpiece 118a and develops a current representative signal representing the current supplied to the workpiece 118a. For example, a Hall-effect current detector or a DC current-transformer may be used as the current detector 120. The current representative signal from the current detector 120 is coupled to control means, e.g. a control circuit 122, via pulse current detecting means, e.g. a pulse current detector 121, which will be described in detail later.

A reference current signal is also coupled to the control circuit 122 from a reference source 124. The reference source 124 is arranged to provide a variable reference current signal. The control circuit 122 provides such a control signal to a drive circuit 126 as to make the difference between the current representative signal and the reference current signal become zero (0). The drive circuit 126 operates to control, e.g. PWM control, the conduction periods of the semiconductor switching devices of the inverter 108 in accordance with the control signal provided by the control circuit 122 in such a manner that a DC load current having a value corresponding to the reference current signal flows through the workpiece 118a and the torch 118b. Accordingly, by changing the value of the reference current signal, the value of the load current flowing through the workpiece 118a and torch 118b can be set to a desired value ranging between a large current of, for example, 300 A, and a small current of, for example, 1 A.

A high-frequency generator 128 is coupled via a coupling coil 130 between the output terminal 116b and the reactor 114. The high-frequency generator 128 is used to break the insulation provided by the gap between the workpiece 118a and the torch 118b to initiate arcing therebetween. During the start-up of the TIG welder, the high-frequency generator 128 applies a high-frequency voltage having a frequency of, for example, 1–3 MHz and a magnitude of 5–20 kV between the workpiece 118a and the torch 118b for a short time. A capacitor 131 bypasses the high-frequency signal generated by the high-frequency generator 128.

Figure 4:
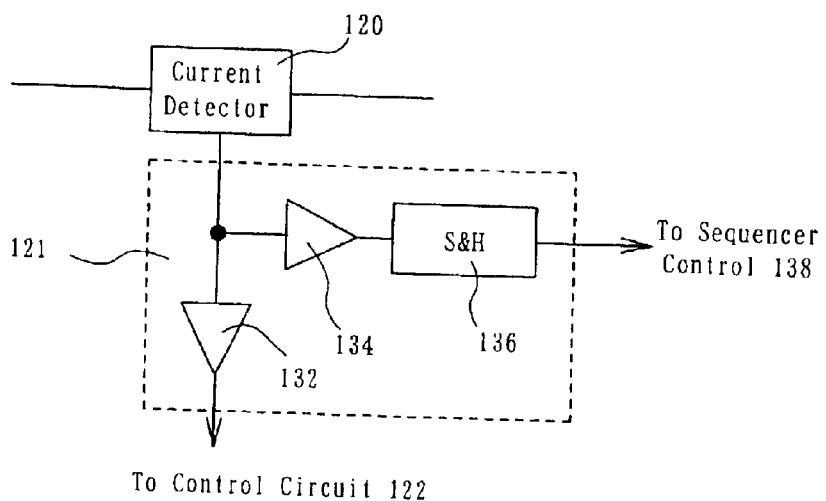
FIG. 4 is a detailed block circuit diagram of a pulse current detector used in the power supply apparatus of FIG. 3.

As shown in FIG. 4, the pulse current detector 121 includes amplifiers 132 and 134 which amplify the current representative signal from the current detector 120. An output signal from the amplifier 132 is applied to the control circuit 122, and an output signal from the amplifier 134 is applied to a sample-and-hold circuit 136. Even when the current representative signal is a signal representing a small current of, for example, 1A, it is amplified by the amplifiers 132 and 134, and, therefore, large amplified signals are supplied to the control circuit 122 and to the sample-and-hold circuit 136. An output signal from the sample-and-hold circuit 136 is coupled to sequencer control means, e.g. a sequencer control 138. In accordance with the output signal from the sample-and-hold circuit 136, the sequencer control 138 controls a sequencing circuit (not shown) which controls, for example, supply of inert gas used in the TIG welder.

Figure 5:
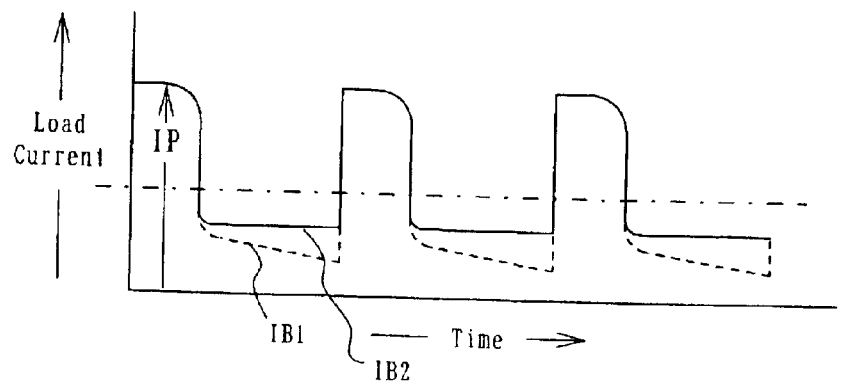
FIG. 5 illustrates a load current flowing when it is set to a small current value in the power supply apparatus of FIG. 3.

The TIG welder power supply apparatus is provided with pulse current supplying means. Specifically, a series combination of a pulse current setting source 139 and switching means, e.g. a pulse forming switch 140, is connected to the output of the control circuit 122 via an OR circuit formed of diodes 142 and 144. In response to a command signal supplied from a pulse forming switch operator 146, the pulse forming switch 140 alternates between open and closed states at a given frequency of, for example, from 100 Hz to 250 Hz and with a given duty ratio of, for example, from 10% to 80%. The reference current signal from the reference source 124 is applied to the pulse forming switch operator 146. When the reference current signal is set to a value corresponding to a load current smaller than a predetermined current value of e.g. 5 A, the pulse forming switch operator 146 provides the command signal to the pulse forming switch 140. The predetermined current value is a value below which the sequence circuit cannot operate properly or an arc tends to be disrupted. When the command signal is generated, a pulse signal having a frequency between 100 Hz and 250 Hz and a duty ratio between 10% and 80% is superposed on the control signal applied to the drive circuit 126. The inverter 108 is controlled by the control signal with the pulse signal superposed on it, and, therefore, the load current becomes a base current IB1 or IB2 on which a pulse current IP is periodically superposed, as shown in FIG. 5.

Charge-discharge means, e.g. a charge-discharge circuit, is connected between the node at which the cathodes of the diodes 112 and 113 are connected together and the node at which the reactor 114 and the coupling coil 130 are connected together. Specifically, the anode of a charging diode 148 is connected to the junction of the cathodes of the diodes 112 and 113, and the cathode of the diode 148 is connected to one end of a charging capacitor 150. The other end of the capacitor 150 is connected to the junction of the reactor 114 and the coupling coil 130. A discharging resistor 152 is connected in parallel with the charging diode 148. The capacitor 150 is charged through the charging diode 148 when the pulse current IP shown in FIG. 5 flows, and discharges through the discharging resistor 152 when the pulse current IP is not flowing. The discharge time constant is determined in relation to the frequency of the pulse current, and, may be, for example, from 10 ms to 30 ms.

With the above-described arrangement of the TIG welder power supply apparatus, if the reference source 124 is set to provide a load current of greater than the predetermined current value, for example, 5 A, the pulse forming switch operator 146 causes the pulse forming switch 140 to be open. In this state, with a DC voltage being applied between the output terminals 116a and 116b, the operation of the high-frequency generator 128 results in breaking of the insulation provided by the gap between the workpiece 118a and the torch 118b so that an arc voltage is generated and a DC load current flows through the workpiece 118a and torch 118b.

The current representative signal representing the load current is supplied from the current detector 120 to the amplifiers 132 and 134 of the pulse current detector 121. The amplified version of the current representative signal is applied to the control circuit 122, which, in turn, provides such a control signal to the drive circuit 126 as to make the amplified current representative signal become equal to the reference current signal from the reference source 124. In this manner, the load current is controlled to have a constant value corresponding to the reference current signal set in the reference source 124. Since the load current has a value larger than 5A and is constant, the sample-and-hold circuit 136 of the pulse current detector 121 does not operate, and the sequencer control 138 operates in a normal way to make the sequencing circuit operate in response to the flowing of the load current and start controlling supply of inert gas etc.

The capacitor 150 is charged by the load current through the charging diode 148. When the voltage across the capacitor 150 becomes higher than the voltage between the output terminals 116a and 116b, the capacitor 150 discharges through the resistor 152. However, since the discharge current is small relative to the load current which has a large value of 5 A, it little affects the load current.

When the reference current signal from the reference source 124 is set such as to make the average value of the load current to be smaller than 5 A, e.g. 1A, as represented by a horizontal phantom line in FIG. 5, the pulse forming switch 140 alternates between an open state and a closed state in response to the command signal from the pulse forming switch operator 146. During an interval when the switch 140 is closed, the drive circuit 126 receives the control signal from the control circuit 122 on which the signal from the pulse current setting source 139 has been superposed. As a result, the high-frequency voltage induced in the secondary winding 110S of the voltage-transformer 110 increases during an interval when the switch 140 is closed. This high-frequency voltage is smoothed by the diodes 112 and 113 and the smoothing reactor 114, but it cannot be entirely smoothed. Accordingly, the capacitor 150 is charged by the peak voltage of the smoothed high-frequency voltage. Then, the pulse current IP flows into the load.

Since the setting of the reference source 124 is such that the load current of smaller than 5 A, e.g. 1 A, on average is to be provided, the control circuit 122 provides such a control signal as to cause the load current of 1 A on average to flow through the current detector 120. Therefore, if the peak value of the pulse current IP has a magnitude of, for example, 5 A, the base current between adjacent current pulses of the pulse current IP should become smaller than 1 A, as indicated by "IB1" in FIG. 5, in order to maintain the average of the load current at 1A. This would tend to cause disruption of arcing. However, when the pulse current IP is not flowing, i.e. during intervals between adjacent current pulses of the pulse current IP, the voltage across the capacitor 150 is larger than the voltage appearing between the output terminals 116a and 116b, and, therefore, the capacitor 150 discharges through the discharging resistor 152. The current, therefore, flows from the output terminal 116a toward the output terminal 116b. This current boosts the load current up to the one indicated by "IB2" in FIG. 5, and, the base current portion is made even. This prevents arcing from being disrupted.

Thus, the welder powered from the power supply apparatus described above can weld small-sized articles, such as small electronic components, with a small current without causing arcing disruption. The arrangement for generating the pulse current used in small-current welding can be provided simply by connecting the pulse current setting source 139, the pulse forming switch 140 and the pulse forming switch operator 146 to the drive circuit 126 which drives the inverter 108.

When the pulse current IP initially flows, the current representative signal from the current detector 120 is pulse-shaped. However, it is amplified sufficiently by the amplifier 134 before it is applied to the sample-and-hold circuit 136. Accordingly, the current representative signal from the current detector 120 can be reliably sampled and held, and, therefore, a signal having a magnitude sufficient to operate the sequencer control circuit 138 can be provided.

The present invention has been described as being embodied in a power supply apparatus for a TIG welder, but it can be embodied in power supply apparatuses for different types of welders.

The value of the pulse current IP has been stated to be 5 A, but it can be other value, or can be variable in response to the reference current signal set by the reference source 124.

In the above-described arrangement, the pulse current provided by the pulse current supplying means, including the pulse current setting source 139 and the pulse forming switch 140, is superposed on the control signal from the control circuit 122. Alternatively the pulse current may be superposed on the signal from the pulse current detector 121 or on the reference current signal from the reference source 124.

Instead of connecting the output terminal 116a to the workpiece 118a and connecting the other output terminal 116b to the torch 118b, the output terminal 116a can be connected to the torch 118b with the output terminal 116b connected to the workpiece 118a.

The pulse forming switch 140 may be a mechanical one or electronic one.

What is claimed is:

1. A power supply apparatus for a welder, comprising:

a DC source;

a high-frequency converting means for converting a DC signal provided by said DC source to a high-frequency signal;

a transformer for transforming said high-frequency signal; and

DC converting means for converting a transformed high-frequency signal from said transformer to a DC signal in order to supply a welder load with a load current that can be set to a desired value within a range of current values;

characterized by pulse current supply means for supplying said welder load with a pulse current having a peak value larger than a predetermined current value when said load current is set to a value smaller than said predetermined current value.

2. The power supply apparatus according to claim 1 further comprising:

control means for controlling said high-frequency converting means in such a manner as to make said load current have said set current value;

when said load current is set to a value smaller than said predetermined current value, said pulse current supplying means controlling said high-frequency converting means in such a manner that said load current can contain a pulse current provided by said pulse current supplying means.

3. The power supply apparatus according to claim 1 wherein said pulse current supplying means is arranged to supply said pulse current to said welder load repetitively at predetermined intervals; and said power supply apparatus further including charge-discharge means in an output side of said DC converting means, said charge-discharge means being charged with each pulse of said pulse current, and discharged when no current pulse occurs.

4. The power supply apparatus according to claim 1, said power supply apparatus being adapted for use with a TIG welder, and further comprising a sequencer control device operable in response to the occurrence of said pulse current.

* * * * *